US 11,705,589 B2

(12) United States Patent
He et al.

(10) Patent No.: US 11,705,589 B2
(45) Date of Patent: Jul. 18, 2023

(54) PRESSURE BALANCING DEVICE

(71) Applicant: ILLINOIS TOOL WORKS INC., Glenview, IL (US)

(72) Inventors: Jiahui He, Shanghai (CN); Mengli Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 24 days.

(21) Appl. No.: 17/323,728

(22) Filed: May 18, 2021

(65) Prior Publication Data

US 2021/0367283 A1    Nov. 25, 2021

(30) Foreign Application Priority Data

May 20, 2020    (CN) .......................... 202010432576.0

(51) Int. Cl.
*H01M 10/44*    (2006.01)
*G05D 16/20*    (2006.01)
(52) U.S. Cl.
CPC ...... *H01M 10/445* (2013.01); *G05D 16/2066* (2013.01); *H01M 2200/20* (2013.01)
(58) Field of Classification Search
None
See application file for complete search history.

(56) References Cited

FOREIGN PATENT DOCUMENTS

| EP | 2503199 A1 * | 9/2012 | ............... F16J 13/24 |
| WO | WO-2013154166 A1 * | 10/2013 | ............. H01G 11/16 |
| WO | WO-2021105052 A1 * | 6/2021 | ............. F16K 17/16 |

OTHER PUBLICATIONS

WO-2013154166-A1—Machine Translation (Year: 2013).*
WO-2021105052-A1—Machine Translation (Year: 2021).*
EP-2503199-A1—Machine Translation (Year: 2016).*

* cited by examiner

*Primary Examiner* — Brian R Ohara
*Assistant Examiner* — Patrick Marshall Greene
(74) *Attorney, Agent, or Firm* — Quarles & Brady LLP

(57) ABSTRACT

Provided is a pressure balancing device, having a mounting seat and a cover, wherein an accommodating cavity is formed between the mounting seat and the cover. The pressure balancing device may also have a partition member, wherein the partition member divides the accommodating cavity into first and second accommodating cavities. The partition member may also include a support portion and an elastic portion, the support portion being disposed on the elastic portion and having a vent hole capable of fluidly communicating the accommodating cavities. The elastic portion is elastically deformable so as to move the support portion relative to the cover. The pressure balancing device may also have a breathable film that is disposed on the support portion and covers the vent hole, and that is movable as the support portion moves.

20 Claims, 9 Drawing Sheets

PRESSURE BALANCING DEVICE

RELATED APPLICATION

This application claims the benefit of, and priority from, Chinese Application No. 202010432576.0 filed May 20, 2020, which is hereby incorporated by reference in its entirety.

FIELD OF THE DISCLOSURE

The present disclosure relates to a pressure balancing device, and in particular, to a pressure balancing device for balancing internal and external pressures of a battery pack.

BACKGROUND

Battery packs generate heat during use, causing the temperature of the battery packs to rise. The pressure inside the battery packs increases as the temperature of gas inside the battery packs increases. If the gas inside the battery packs is not discharged to the outside in a timely manner, the normal use of batteries will be affected. Therefore, it is often necessary to mount a pressure balancing device on the battery pack, and the gas inside the battery pack is discharged to the external environment through the pressure balancing device to ensure the pressure balance between the inside and the outside of the battery pack.

SUMMARY

In some cases, when the pressure inside the battery pack increases to a certain value, a pressure balancing device needs to be capable of quickly relieving the pressure.

The pressure balancing device of the present disclosure uses the elastic deformation of the elastic portion to move the breathable film, and enables the breathable film to be punctured by a spike portion without relying on the elastic deformation of the breathable film itself. Therefore, in some cases, the pressure balancing device can quickly release the pressure inside the battery pack.

The present disclosure provides a pressure balancing device capable of quickly releasing pressure, comprising: a mounting seat and a cover, wherein an accommodating cavity is formed between the mounting seat and the cover; a partition member, wherein the partition member is disposed in the accommodating cavity and is connected to the mounting seat, and the partition member divides the accommodating cavity into a first accommodating cavity and a second accommodating cavity; wherein the first accommodating cavity is formed between the cover and the partition member and is configured to be capable of being in fluid communication with the external environment, and the second accommodating cavity is formed between the partition member and the mounting seat and is configured to be capable of being in fluid communication with an internal space of a component to be depressurized; and wherein the partition member comprises a support portion and an elastic portion, the support portion is disposed on the elastic portion, the support portion is provided with a vent hole capable of fluidly communicating the first accommodating cavity with the second accommodating cavity, and the elastic portion is configured to be elastically deformable so as to move the support portion relative to the cover; and a breathable film, wherein the breathable film is disposed on the support portion and covers the vent hole in the support portion, and the breathable film is configured to be movable as the support portion moves.

According to the above content, the partition member is configured, when a pressure difference between the first accommodating cavity and the second accommodating cavity is greater than a preset value, to enable the elastic portion to be elastically deformed to move the support portion toward the cover, so as to drive the breathable film to move toward the cover.

According to the above content, the elastic portion is cylindrical, and the support portion closes one end of the cylindrical elastic portion; and the partition member further comprises a connecting flange, and the connecting flange protrudes outward from an outer surface of the cylindrical elastic portion; wherein the partition member is connected to the mounting seat via the connecting flange.

According to the above content, a cylindrical wall of the cylindrical elastic portion comprises a corrugated portion, which is configured to be expandable or contractible in a deformation direction of the elastic portion, so as to move the support portion.

According to the above content, the connecting flange is in an annular shape extending outward around the outer surface of the cylindrical elastic portion, the annular connecting flange comprises an annular sealing edge protruding toward the mounting seat, and the partition member is in sealed connection with the mounting seat via the annular sealing edge.

According to the above content, an inner surface of the cover is provided with a spike portion, the spike portion protrudes toward the breathable film, and the spike portion is configured to be capable of puncturing the breathable film.

According to the above content, the support portion is further provided with a receiving hole, which is configured to be capable of receiving the spike portion of the cover.

According to the above content, the breathable film is made of a composite of a plastic material and a non-woven fabric material.

According to the above content, the partition member is integrally formed from a rubber material.

According to the above content, the breathable film is molded on the partition member.

Figure 1A:
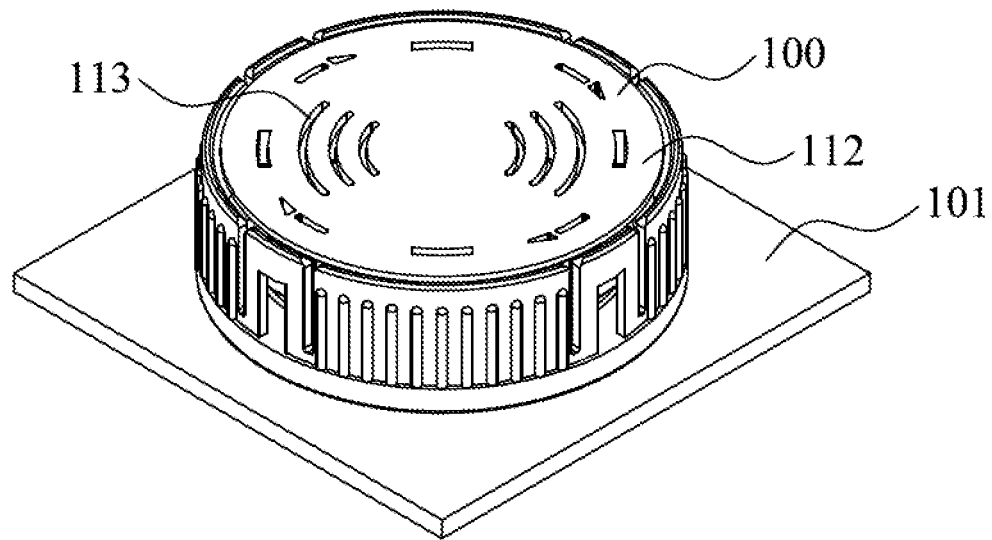
FIGS. 1A and 1B are structural perspective diagrams of a pressure balancing device when mounted on a battery pack housing according to an embodiment of the present disclosure from two perspectives.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Various specific embodiments of the present disclosure are described below with reference to the accompanying drawings which constitute part of this description. It should be understood that although the terms for indicating orientations, such as "front", "rear", "upper", "lower", "left", "right", "top", "bottom", "inner" and "outer", are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms for indicating orientations are only illustrative and should not be considered as limitations.

Figure 1B:
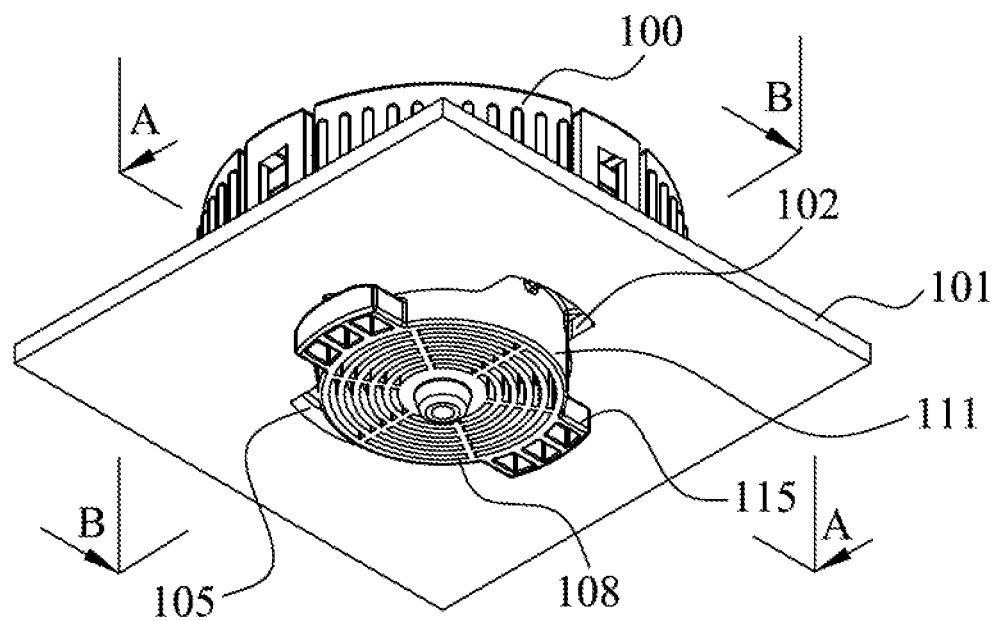

FIGS. 1A and 1B are structural perspective diagrams of a pressure balancing device 100 when mounted on a battery pack housing according to an embodiment of the present disclosure from two perspectives. In the example as shown in FIGS. 1A and 1B, only part of a plate 101 of the battery pack housing that is used for mounting the pressure balancing device 100 is shown. Although the complete battery pack is not shown in FIGS. 1A and 1B, it can be understood that a space below the plate 101 is an accommodating space inside the battery pack for accommodating a battery assembly, and a space above the plate 101 is in fluid communication with the external environment.

As shown in FIGS. 1A and 1B, the pressure balancing device 100 is configured to be mounted on the plate 101 of the battery pack housing. Through the pressure balancing device 100, the accommodating space inside the battery pack (not shown in FIGS. 1A and 1B) for accommodating the battery assembly can be in fluid communication with the external environment. When the gas pressure inside the battery pack is greater than that of the external environment, the gas inside the battery pack can be released to the external environment through the pressure balancing device 101, thereby releasing the pressure of the battery pack. However, during the storage or use of the battery pack, the gas pressure inside the battery pack may be lower than the ambient air pressure. In this case, the gas in the external environment may also flow into the battery pack through the pressure balancing device.

Specifically, the plate 101 is provided with a mounting hole 102, and the pressure balancing device 100 is mounted in a snap-fit manner on the plate 101 through the mounting hole 102. The pressure balancing device 100 comprises a mounting seat 111 and a cover 112 connected together, and the mounting seat 111 has a shape corresponding to that of the mounting hole 102 so as to extend to a position below the plate 101 through the mounting hole 102. In this embodiment, the mounting hole 102 comprises end holes 105 located on two sides of a main hole, the bottom of the mounting seat 111 is provided with wings 115 protruding to two sides, and the wings 115 and the end holes 105 match in shape. When the pressure balancing device 100 is mounted to the plate 101, an operator can first cause the wings 115 of the pressure balancing device 100 to pass through the mounting hole 102, and then rotate the pressure balancing device by about 90°, so that the pressure balancing device 100 can be mounted in a snap-fit manner on the plate 101.

In this embodiment, the bottom of the mounting seat 111 of the pressure balancing device 100 is provided with a vent hole 108, and the accommodating space inside the battery pack can be in fluid communication with the inside of the pressure balancing device 100 through the vent hole 108. A top of the cover 112 is provided with a vent hole 113, and the inside of the pressure balancing device 100 can be in fluid communication with the external environment through the vent hole 113. In this way, the accommodating space inside the battery pack can be in fluid communication with the external environment through the pressure balancing device 100.

Figure 2:
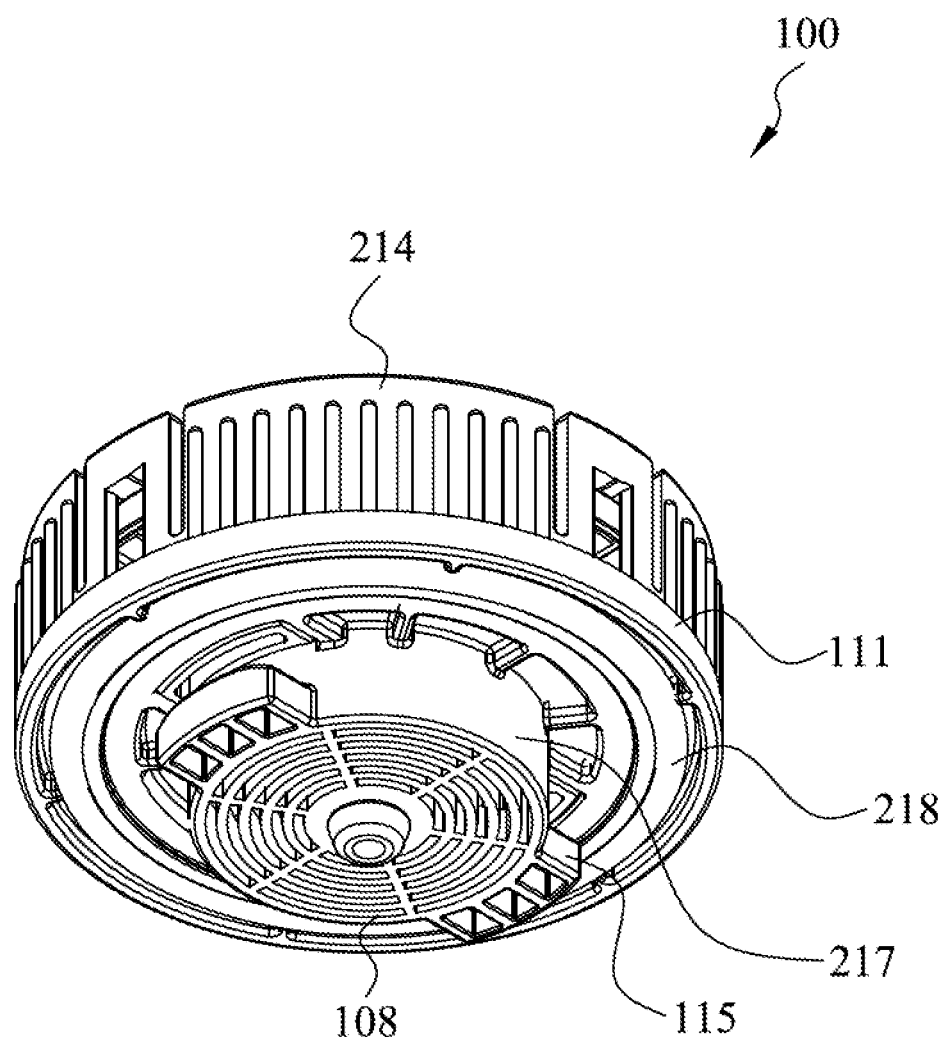
FIG. 2 is a structural perspective diagram of the pressure balancing device shown in FIG. 1A.

FIG. 2 shows a structural perspective diagram of the pressure balancing device 100 in FIGS. 1A and 1B, for showing an external structure of the pressure balancing device 100. As shown in FIG. 2, the mounting seat 111 comprises a button portion 214 substantially in the shape of a button, and a cylindrical portion 217 connected to lower end of the button portion 214. The button portion 214 is configured to be covered by and connected to the cover 112, and the cylindrical portion 217 has a cylindrical shape and is formed by extending downward from a middle portion of the button portion 214.

In the embodiment as shown in FIG. 2, an annular sealing ring 218 that surrounds the circumference of the cylindrical portion 217 is provided at the bottom of the button portion 214, and the sealing ring 218 is configured to abut against an upper surface of the plate 101 (see FIGS. 8A and 8B) to achieve seal between the pressure balancing device 100 and the battery pack housing.

Figure 3A:
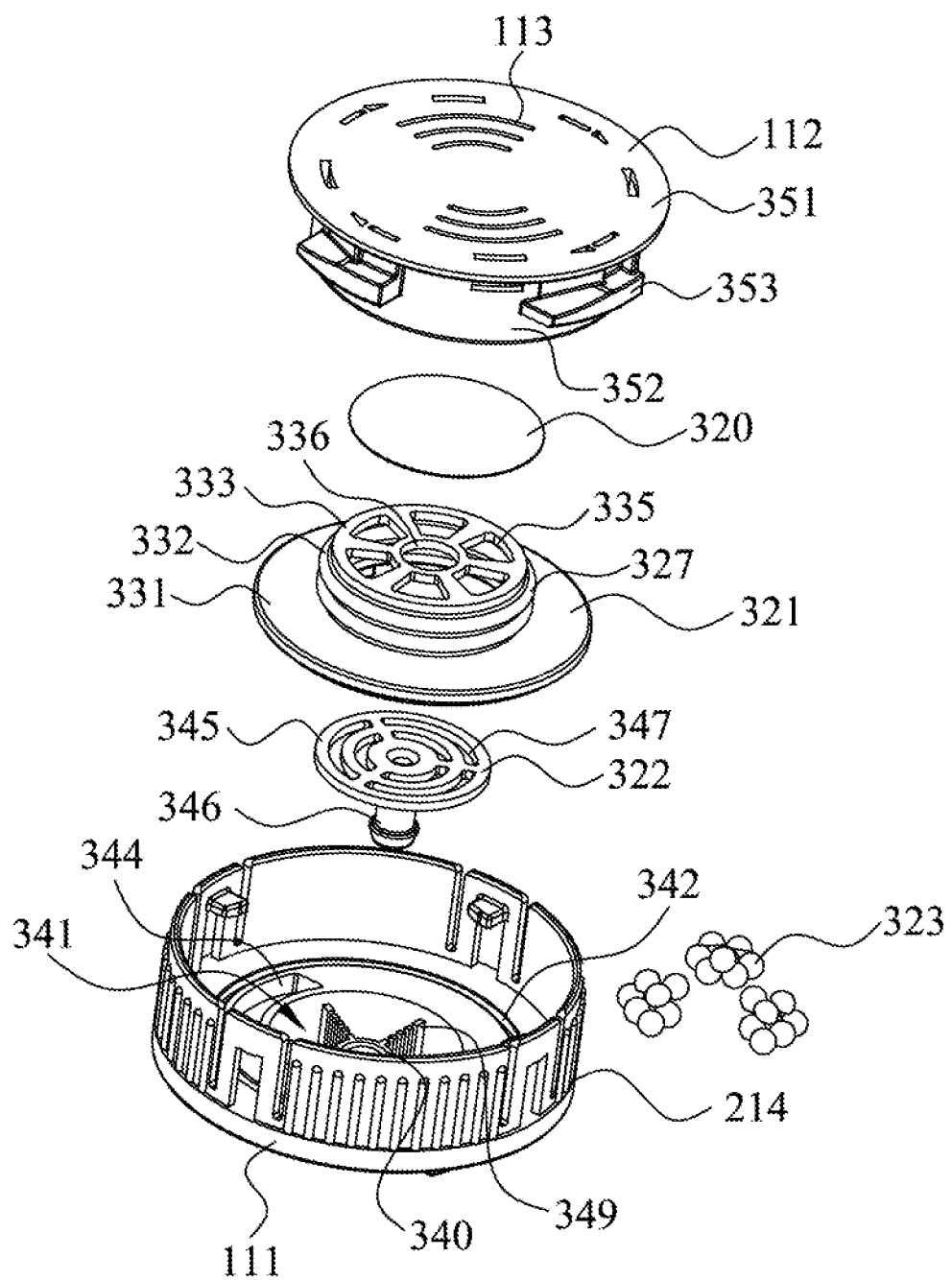
FIGS. 3A and 3B are exploded views of the pressure balancing device shown in FIG. 2 from two perspectives.
Figure 3B:
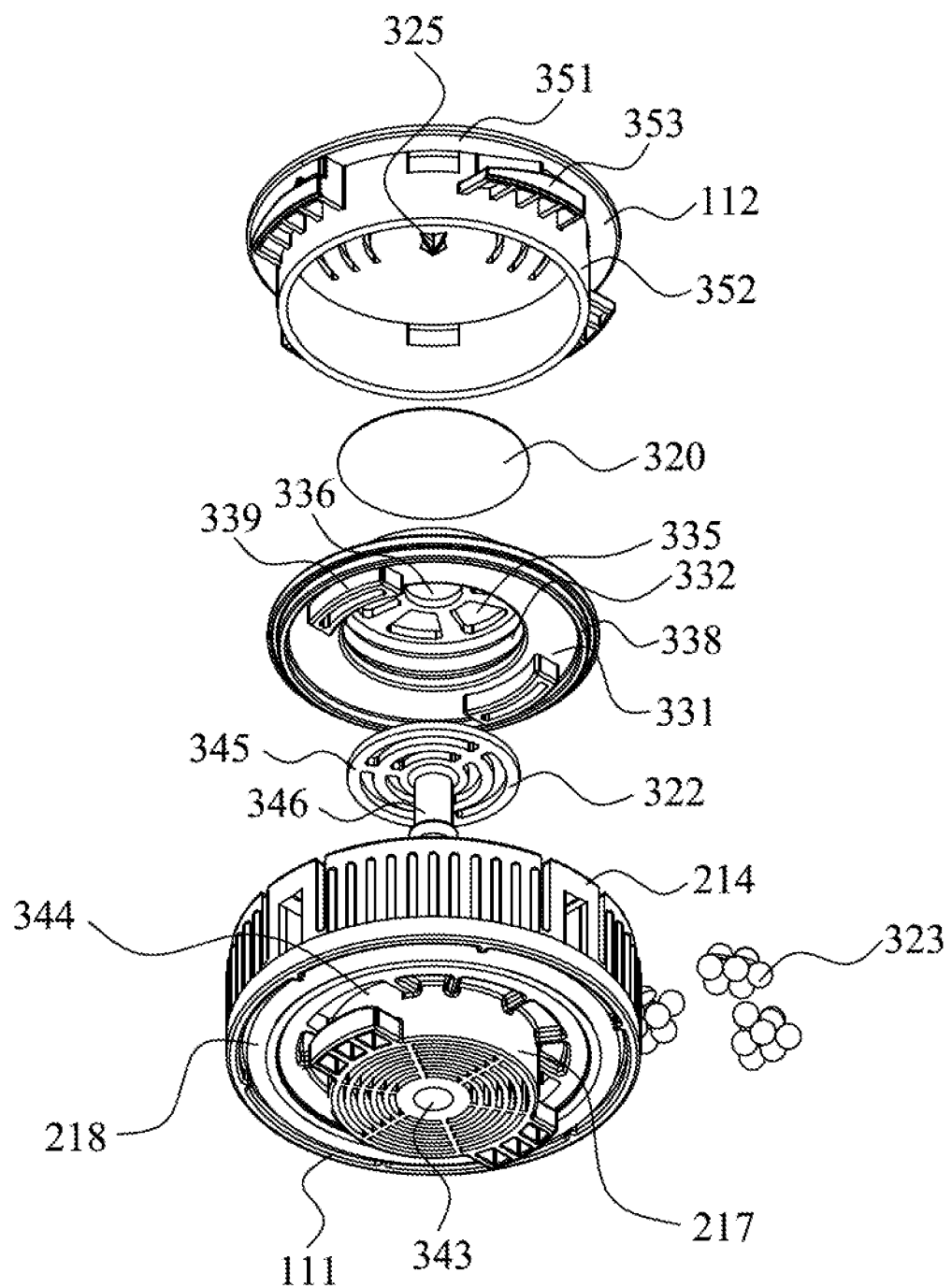
Figure 8A:
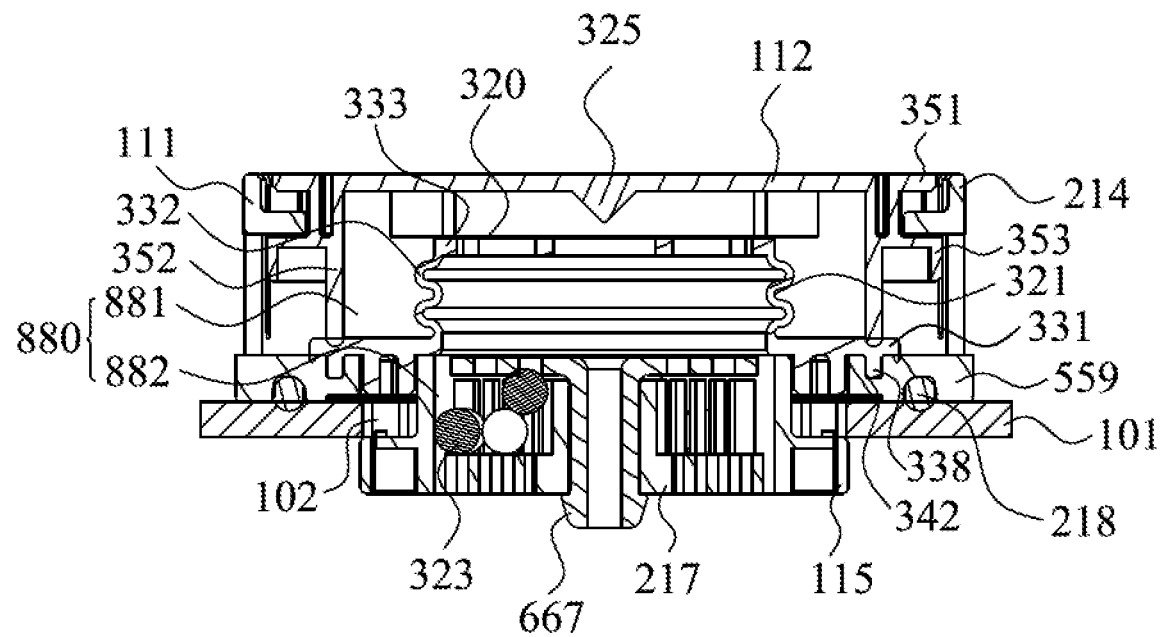
FIG. 8A is a cross-sectional view of the pressure balancing device mounted on the battery pack housing shown in FIG. 1B along line A-A.
Figure 8B:
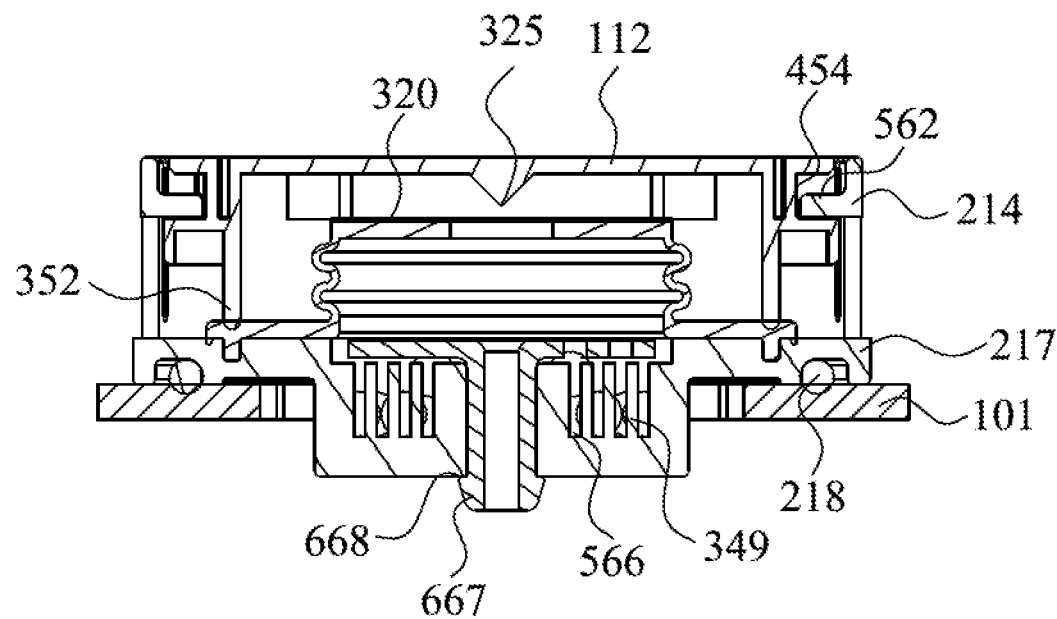
FIG. 8B is a cross-sectional view of the pressure balancing device mounted on the battery pack housing shown in FIG. 1B along line B-B.

FIGS. 3A and 3B are exploded views of the pressure balancing device 100 from two different perspectives, for showing general shapes and relative positions of internal components of the pressure balancing device 100. As shown in FIGS. 3A and 3B, in addition to the cover 112 and the mounting seat 111, the pressure balancing device 100 further comprises a breathable film 320, a partition member 321, a covering member 322, and a drying component 323, which are all disposed inside the pressure balancing device 100, and are located in an accommodating space formed by the cover 112 and the mounting seat 111 (see an accommodating cavity 880 as shown in FIGS. 8A and 8B).

As shown in FIGS. 3A and 3B, an outer surface of the top 351 of the cover 112 faces the external environment, and the vent hole 113 is provided on the top 351 and penetrates the top. The vent hole 113 is configured to communicate the accommodating cavity 880 with the external environment to discharge gas from the accommodating cavity 880 to the external environment. An inner surface of the top 351 of the cover 112 is further provided with an inwardly-protruding spike portion 325. A side wall 352 of the cover 112 is provided with a number of snap-fit members 353 configured to be mounted in a cooperating manner to the mounting seat 111. This will be described in detail in conjunction with the specific structures of the cover 112 and the mounting seat 111 in FIGS. 4A-5B.

The breathable film 320 is substantially a circular thin sheet, is located below the top 351 of the cover 112, and is disposed close to the top 351. The breathable film 320 is made of a waterproof and breathable material. The breathable film 320 can prevent liquid in the external environment from entering the inside of the battery pack while ensuring the gas communication between the inside of the battery pack and the external environment, so as to achieve the dustproof, waterproof and breathable effects. As an example, the breathable film 320 is made of a composite of a plastic material and a non-woven fabric material. In this embodiment, the breathable film 320 is made of a composite of an ePTFE material and a non-woven fabric material. Compared with a breathable film made of the ePTFE material alone, the breathable film 320 made of the composite of the ePTFE material and the non-woven fabric can have better breathability.

The partition member 321 is located below the breathable film 320, and divides the accommodating cavity 880 between the cover 112 and the mounting seat 111 into an upper accommodating cavity 881 and a lower accommodating cavity 882 (see FIGS. 8A and 8B). The partition member 321 comprises a connecting flange 331, an elastic portion 332 and a support portion 333. The support portion 333 is disposed on the elastic portion 332, and the connecting flange 331 is formed by protruding outward from an outer surface of the elastic portion 332. In this embodiment, the elastic portion 332 is made of an elastic material such that the elastic portion 332 can be elastically deformed, for example, in a vertical direction, so that the support portion 333 can move relative to the cover 112. As a specific example, the elastic portion 332 is made of a rubber material. In this embodiment, the elastic portion 332 is substantially cylindrical, with a cylindrical wall thereof comprising a corrugated portion 327 that can be expanded or contracted. The corrugated portion 327 can be expanded or contracted in a direction of elastic deformation, so as to enable the support portion 333 to move relative to the cover 112. In a state as shown in FIGS. 3A and 3B, the corrugated portion 327 is in a contracted state. with respect to the position of the support portion 333 supported by the corrugated portion 327 in the contracted state as shown in FIGS. 3A and 3B, when the corrugated portion 327 is deformed to the expanded state, the position of the support portion 333 supported by the corrugated portion 327 is closer to the top 351 of the cover 112.

The support portion 333 is connected to and covers the top of the cylindrical elastic portion 332. The support portion 333 is provided with a vent hole 335 penetrating the support portion 333, and the breathable film 320 is disposed on the support portion 333 and covers the vent hole 335. As an example, there is a certain connection strength between the breathable film 320 and the support portion 333, so that the breathable film 320 and the support portion 333 can move together. In this embodiment, the breathable film 320 is molded on the support portion 333 by means of processes such as injection molding, which is not only convenient to machine, but also ensures a certain connection strength between the breathable film 320 and the partition member 321. The support portion 333 is further provided with a receiving hole 336 penetrating the support portion 333 approximately at the center. The receiving hole 336 is configured to receive the spike portion 325 on the cover 112 when the support portion 333 moves to a specific position relative to the cover 112.

The connecting flange 331 is in an annular shape extending outward around the outer surface of the elastic portion 332, and is connected to a bottom end of the elastic portion 332. An annular sealing periphery 338 protruding in a direction of the mounting seat 111 is formed on an outer periphery of a bottom surface of the connecting flange 331, and a pair of oppositely disposed pre-mounting bosses 339 is provided on an inner side of the annular sealing periphery 338. The connecting flange 331 is configured to be connected to the mounting seat 111. In this embodiment, the partition member 321 is pre-mounted to the mounting seat 111 through the pre-mounting bosses 339, and is in sealed connection with the mounting seat 111 via the annular sealing periphery 338.

In order to facilitate machining, in this embodiment, the connecting flange 331, the elastic portion 332 and the support portion 333 of the partition member 321 are integrally formed from a rubber material. When the connecting flange 331 is made of an elastic material, the annular sealing periphery 338 can function as an elastic seal. Certainly, in other embodiments, only the elastic portion 332 may be made of an elastic material.

The covering member 322 is substantially umbrella-shaped, is disposed between the partition member 321 and the mounting seat 111, and is configured to prevent the movement of the drying component 323 relative to the mounting seat 111 when there is gas flow passing through. The covering member 322 comprises a top plate 345 and an insertion portion 346, wherein one end of the insertion portion 346 is connected to the lower end of the top plate 345, and the other end thereof is connected to the mounting seat 111. In this embodiment, the top plate 345 has a hollowed-out channel 347 that allows the gas flow to pass through but can prevent the drying component 323 from passing through.

An inner side of the bottom of the button portion 214 of the mounting seat 111 is provided with a sealing groove 342 and pre-mounting holes 344. The position of the sealing groove 342 corresponds to that of the annular sealing periphery 338 of the partition member 321, and the positions of pre-mounting holes 344 correspond to those of the pre-mounting bosses 339 of the partition member 321, so that the partition member 321 and the mounting seat 111 are correspondingly mounted. An accommodating space 341 is formed on an inner side of the cylindrical portion 217 of the mounting seat 111. The top plate 345 of the covering member 322 can close the accommodating space 341 from above. The accommodating space 341 is configured to accommodate the drying component 323. As a specific example, the center of the cylindrical portion 217 is provided with a cylinder 340, and a mounting hole 343 configured to receive the insertion portion 346 of the covering member 322 is formed in the cylinder 340. In the accommodating space 341 between a cylindrical wall of the cylinder 340 and the cylindrical portion 217, a number of partition plates 349 are further provided. The drying component 323 is accommodated between adjacent partition plates 349.

The drying component 323 is made of a silica gel desiccant, an alumina gel desiccant or a molecular sieve desiccant, is configured to absorb moisture from the pressure balancing device 100, and can prevent moisture in the gas in the external environment from entering the inside of the battery pack. In this embodiment, the drying component 323 comprises a plurality of desiccant particles, which are spherical. In other embodiments, the drying component 323 may also be made into other shapes and structures (e.g., hemispherical).

Figure 4A:
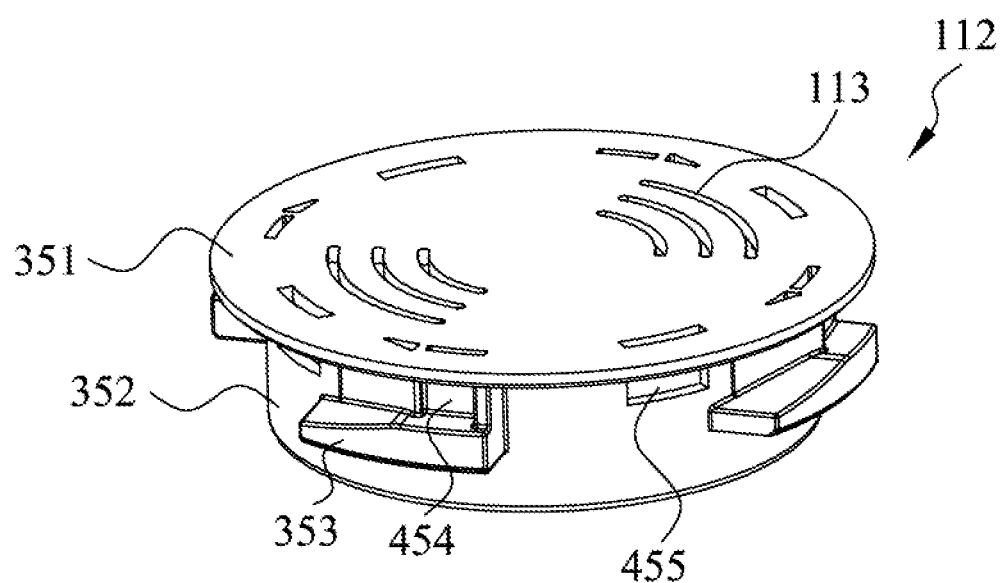
FIGS. 4A and 4B are structural perspective diagrams of a cover in the pressure balancing device shown in FIG. 3A from two perspectives.
Figure 4B:
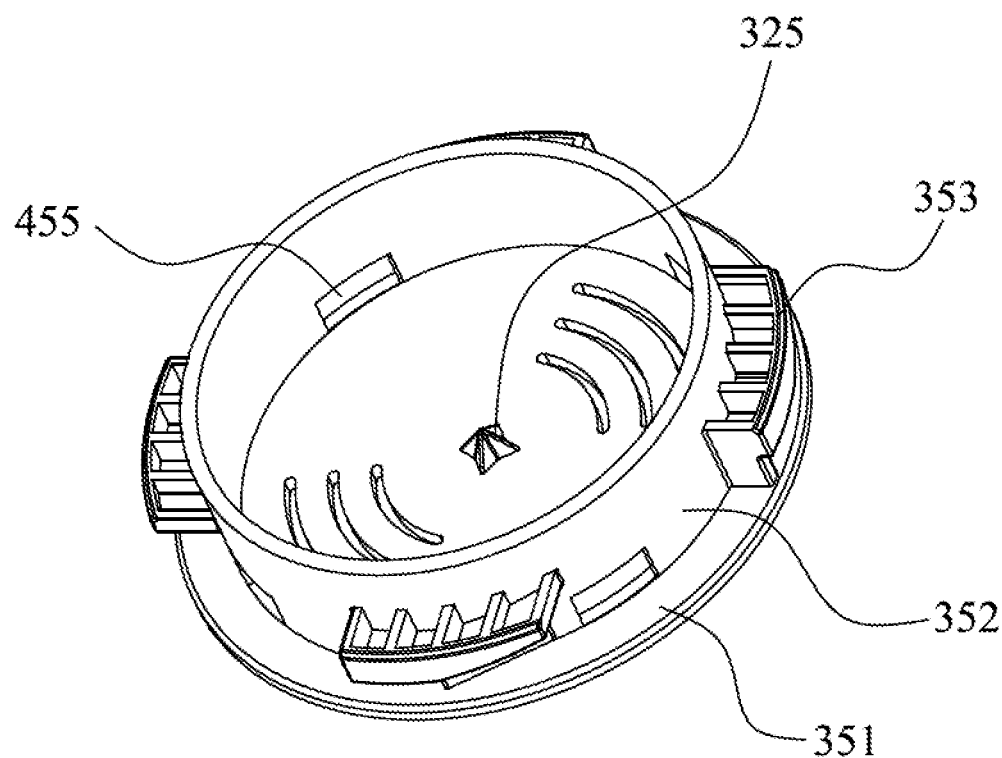

FIGS. 4A and 4B are structural perspective diagrams of the cover 112 from two different perspectives, wherein FIG. 4B shows a view in which the cover 112 shown in FIG. 4A has been turned an angle from bottom to top, to show the internal structure of the cover 112. As shown in FIGS. 4A and 4B, the side wall 352 of the cover 112 is connected to lower end of the top 351, the side wall 352 is substantially cylindrical, and the outer diameter of the side wall 352 is less than that of the top 351. A bottom end face of the side wall 352 is horizontal and is configured to abut against an upper surface of the connecting flange 331 of the partition member 321. The side wall 352 is provided with a plurality of snap-fit members 353 protruding outward from an outer surface thereof, and the snap-fit members 353 are located below the top 351 and are evenly disposed around the circumference of the side wall 352. Each of the snap-fit members 353 is substantially in the shape of an elongated strip, and a length direction thereof is consistent with the circumferential direction of the side wall 352. There is a certain distance between each of the snap-fit members 353 and the top 351, so as to provide a snap-fit groove 454. Specifically, there is one snap-fit groove 454 above each of the snap-fit members 353. The snap-fit groove 454 is disposed on the side wall 352 between the top 351 and the corresponding snap-fit member 353, and is formed by being recessed inward from the outer surface of the side wall 352. As an example, a top surface of the snap-fit member 353 has a certain slope. Specifically, the snap-fit member 353 has a distal end remote from the snap-fit groove 454 and a proximal end close to the snap-fit groove 454. A top surface of the distal end is farther away from the top 351 than a top surface of the proximal end. In this embodiment, four snap-fit members 353 are evenly arranged in the circumferential direction of the cover 112, and four snap-fit grooves 454 are correspondingly provided. In other embodiments, different number of snap-fit members 353 and snap-fit grooves 454 may be provided.

Still as shown in FIGS. 4A and 4B, in addition to the vent hole 113 that is provided in the top 351 of the cover 112 for communicating the inside of the pressure balancing device 100 with the external environment, a communicating hole 455 is also provided in the side wall 352 of the cover 112, and the communicating hole 455 extends upward to penetrate the top 351. The communicating hole 455 is configured to communicate inner and outer sides of the cover 112, and in turn communicate the inside of the pressure balancing device 100 on the inner side of the cover 112 with the external environment on the outer side of the cover 112.

As shown in FIG. 4B, the spike portion 325 is substantially located at the center of the cover 112; and the spike portion 325 is in a shape of an inverted cone, and an end thereof is in a shape of a spike. In the example as shown in FIG. 4B, an extension direction of the spike portion 325 is consistent with a height direction of the elastic portion 332 of the partition member 321, i.e., consistent with the direction of elastic deformation of the elastic portion 332.

Figure 5A:
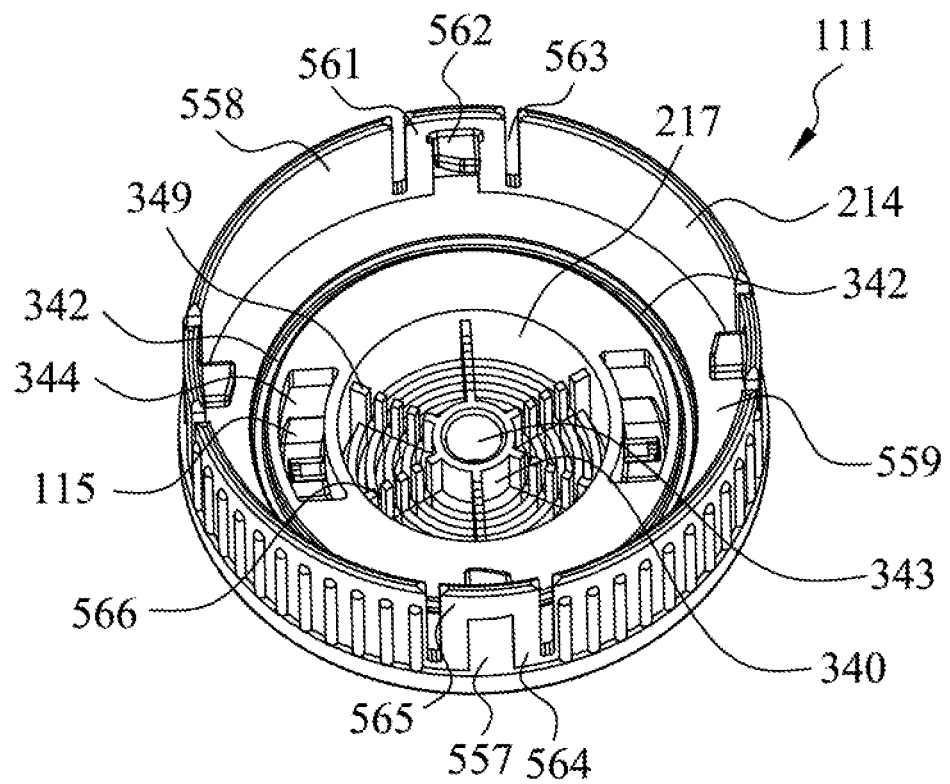
FIGS. 5A and 5B are structural perspective diagrams of a mounting seat in the pressure balancing device shown in FIG. 3A from two perspectives.
Figure 5B:
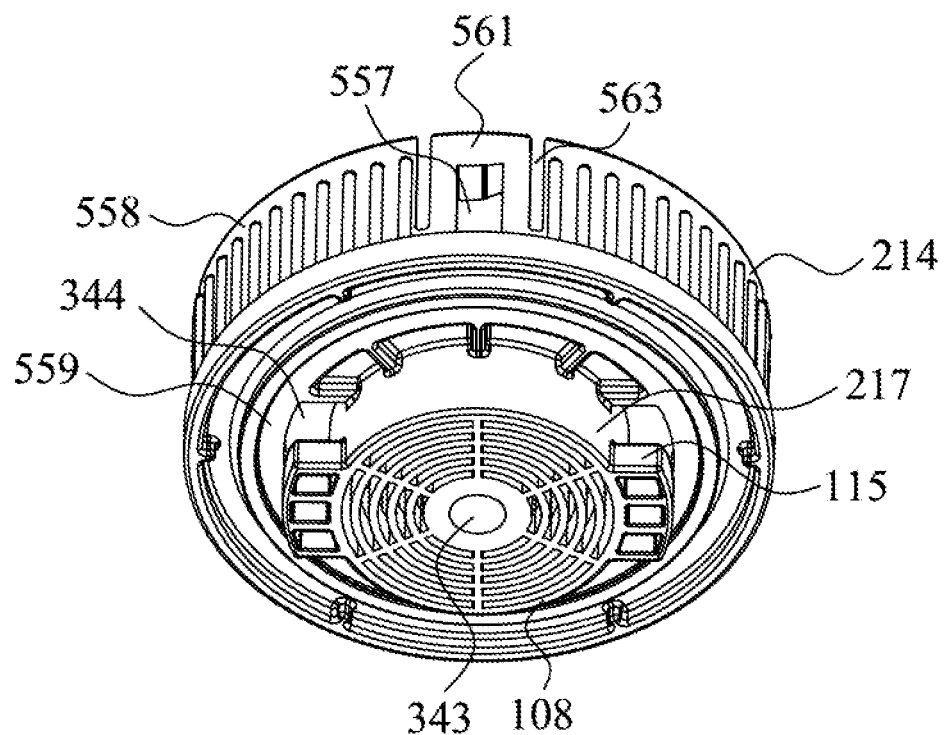

FIGS. 5A and 5B show structural perspective diagrams of the mounting seat 111 from two different perspectives, wherein FIG. 5A shows a perspective viewed from the top to the bottom, and FIG. 5B shows a perspective viewed from the bottom to the top. As shown in FIGS. 5A and 5B, the button portion 214 of the mounting seat 111 comprises a side wall 558 and a bottom 559. The side wall 558 is substantially cylindrical, and the bottom 559 is connected to a bottom end of the side wall 558. The side wall 558 is provided with a plurality of engaging portions 561. The side wall 558 is respectively provided with separating grooves 563 on left and right sides of each of the engaging portions 561. The separating grooves 563 are each formed by extending from an upper edge of the side wall 558 toward the bottom 559. The separating groove 563 is arranged such that only an end 564 of each of the engaging portions 561 close to the bottom 559 is connected to the side wall 558, and the side far away from the bottom 559 forms a free end 565. This arrangement enables the engaging portions 561 to have a certain elasticity, such that when the cover 112 is inserted into the mounting seat 111 from top to bottom and applies an outward force to the engaging portions 561, the engaging portions 561 can move outward (i.e., away from the bottom 559); and when the cover 112 no longer applies the outward force to the engaging portions 561, the engaging portions 561 can return to a free state where they are located on the same circumferential surface as the side wall 558 as shown in FIG. 5A. In this way, the engaging portions 561 can perform expansion and contraction movements. At an inner surface of each of the engaging portions 561 close to the free end 565, an inwardly protruding bump 562 is provided. The bump 562 on each of the engaging portions 561 is located at a position corresponding to the snap-fit groove 454, and the size of the bump 562 corresponds to that of the snap-fit groove 454. In this way, when the bump 562 is accommodated in the snap-fit groove 454 (see FIG. 4A) on the cover 112, the cover 112 connects and covers the mounting seat 111. In the process of assembling the mounting seat 111 and the cover 112, the bump 562 is aligned between the snap-fit member 353 and the top 351 first, and then the mounting seat 111 and the cover 112 are relatively rotated until the bump 562 is inserted into the snap-fit groove 454. During the mounting process, the elongated strip-shaped snap-fit member 353 on the cover 112 can play a guiding role in guiding the movement direction of the bump 562, so that the mounting seat 111 and the cover 112 can be assembled together by means of rotary movement, and the assembly method is simpler. As a more specific example, since the top surface of the snap-fit member 353 has a certain slope, when the mounting seat 111 and the cover 112 are relatively rotated, the cover 112 will further move downward relative to the mounting seat 111, and the bottom end face of the side wall 352 of the cover 112 is tightly pressed against the connecting flange 331 of the partition member 321, so that the partition member 321 also moves downward relative to the mounting seat 111. When the bump 562 is inserted into the snap-fit groove 454, the annular sealing periphery 338 is pressed into the sealing groove 342, such that the partition member 321 is in sealed connection with mounting seat 111.

As an example, each of the engaging portions 561 is further provided with an elongated hole 557 penetrating inner and outer surfaces of the engaging portion 561, and the elongated hole 557 extends from the end 564 of the engaging portion 561 toward the free end 565, but has not yet extended to the free end 565. The bump 562 is connected to an end of the elongated hole 557 close to the free end 565. The arrangement of the elongated hole 557 can weaken the connection between the end 564 of the engaging portion 561 and a body of the side wall 558, better facilitate the expansion and contraction movements of the free end 565, and facilitate mold processing. In this embodiment, there are four snap-fit grooves 454, and there are correspondingly four bumps 562; and each of the bumps 562 can be inserted into one corresponding snap-fit groove 454.

The sealing groove 342 is annularly disposed on the inner side of the bottom 559 of the button portion 214. The sealing groove 342 has an annular shape and is sized and positioned corresponding to the annular sealing periphery 338 of the partition member 321, such that when the mounting seat 111 and the cover 112 are assembled in place, the annular sealing periphery 338 can be pressed tightly in the sealing groove 342, and thus the partition member 321 is hermetically mounted on the bottom 559 of the mounting seat 111. In other examples, a different sealing structure such as a sealing ring may also be used to achieve a sealed connection between the partition member 321 and the bottom 559.

A pair of pre-mounting holes 344 are provided in the bottom 559. The pre-mounting holes 344 are disposed between the sealing groove 342 and the cylindrical portion 217 and penetrate the bottom 559. As an example, the positions of the pair of pre-mounting holes 344 correspond to those of the wings 115 on the outer side of the cylindrical portion 217 to facilitate the machining of the mounting seat 111. The pair of pre-mounting holes 344 has the same size and position as the pair of pre-mounting bosses 339 of the partition member 321, such that the partition member 321 and the mounting seat 111 can be pre-mounted first, and then the partition member 321 is hermetically pressed tightly in the sealing groove 342 while the cover 112 and the mounting seat 111 are mounted.

Still as shown in FIGS. 5A and 5B, the cylindrical portion 217 of the mounting seat 111 has a substantially cylindrical shape coaxial with the side wall of the button portion 214. The bottom of the cylindrical portion 217 is a flat plate with a plurality of vent holes 108, the vent holes 108 are substantially in the shape of a partial ring, are arranged into a number of circles at intervals, and each circle comprises a number of spaced vent holes. In this embodiment, to facilitate machining, the cylindrical portion 217 and the button portion 214 of the mounting seat 111 are integrally formed.

The cylinder 340 and the number of partition plates 349 are disposed in the accommodating space 341 defined by the inner side of the cylindrical portion 217. The cylinder 340 is located at the center of the cylindrical portion 217 and is coaxially arranged with the side wall of the button portion 214. The cylinder 340 is formed by extending in an axial direction of the cylindrical portion 217. The mounting hole 343 penetrates the bottom of the cylinder 340 and the bottom of the cylindrical portion 217. The number of partition plates 349 extend outward around the cylinder 340. One end of each of the partition plates 349 is connected to the cylinder 340, and the other end thereof is connected to the inner wall of the cylindrical portion 217. As an example, the partition plates 349 are evenly distributed in the accommodating space 341 to divide the accommodating space 341 into a number of subspaces of the same size, and each of the subspaces independently accommodates the drying component 323. In this embodiment, there are six partition plates 349, and the six partition plates 349 divide the accommodating space 341 into six subspaces of the same size. As a specific example, desiccant particles in the drying component 323 are substantially divided into three equal parts, and the desiccant particles of each part are alternately placed in the six subspaces respectively. That is to say, for any two adjacent subspaces, there must be one subspace with desiccant particles provided therein, and the other subspace does not have desiccant particles. The drying component 323 is provided in the form of particles and is divided into a plurality of parts that are alternately disposed in a plurality of subspaces, which is advantageous to reducing the interference from the drying component 323 on the air flow, reserves a sufficient flow space for the circulation of the gas in the accommodating space 341, and promotes fluid communication of the gas in the accommodating space 341.

As an example, each of the partition plates 349 is further provided with a number of flow channels 566, and these flow channels 566 can not only ensure the air communication in each space, but also restrict the movement of the desiccant particles. As a specific example, the flow channels 566 extend in a grid shape in the axial direction of the cylinder 340, and the width of the flow channels 566 on each of the partition plates 349 is smaller than the diameter of the desiccant particles.

Figure 6A:
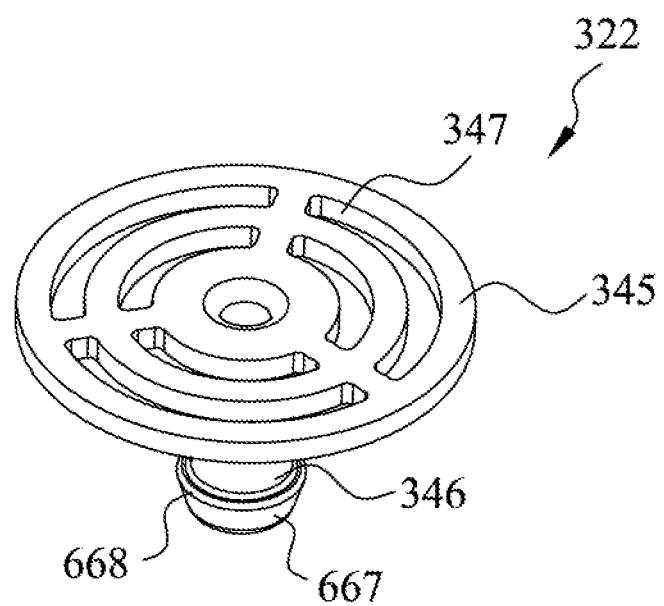
FIGS. 6A and 6B are structural perspective diagrams of a covering member in the pressure balancing device shown in FIG. 3A from two perspectives.
Figure 6B:
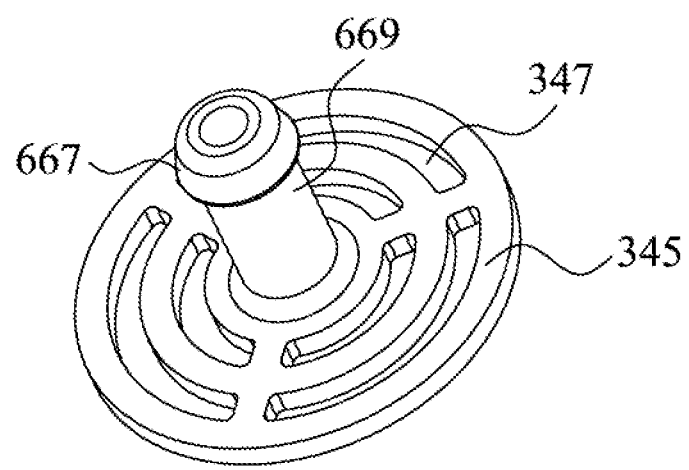

FIGS. 6A and 6B show structural perspective diagrams of the covering member 322 from two different perspectives, wherein FIG. 6A shows a perspective viewed from the top to the bottom, and FIG. 6B shows a view in which the covering member 322 shown in FIG. 6A has been overturned by an angle. As shown in FIGS. 6A and 6B, the top plate 345 of the covering member 322 is provided with a number of hollowed-out channels 347, the hollowed-out channels 347 are arranged into two circles at intervals, and each of the hollowed-out channels 347 is in the shape of a partial ring. The width of the hollowed-out channel 347 is smaller than the diameter of each of the desiccant particles. Similar to the function of the flow channels 566, these hollowed-out channels 347 can not only ensure the air communication in each space, but also restrict the movement of the desiccant particles.

The insertion portion 346 is substantially in the shape of a round rod, and comprises a rod portion 669 and a step portion 667 located at a bottom end of the insertion portion 346. The rod portion 669 is formed by extending vertically downward from the center of the top plate 345, and the step portion 667 is connected to the outer side of the bottom end of the rod portion 669. In this embodiment, the rod portion 669 is configured to be inserted into the mounting hole 343 in the mounting seat 111, and the step portion 667 is configured to be snap-fitted with the bottom of the cylindrical portion 217 to prevent the covering member 322 from moving in the axial direction of the mounting seat 111.

Specifically, a top end of the step portion 667 is provided with a platform 668, and the platform 668 is connected to an outer surface of the rod portion 669. The step portion 667 has an inverted cone shape from the platform 668 to the bottom end of the step portion 667, and the radial dimension thereof gradually decreases. The inverted cone-shaped step portion 667 may be used as a guide structure to assist in the insertion of the insertion portion 346 of the covering member 322 into the mounting hole 343 from top to bottom.

It should also be noted that the outer peripheral diameter of the platform 668 is set to be slightly greater than the diameter of the mounting hole 343. Since the bottom of the cylindrical portion 217 is a flat plate with a plurality of vent holes 108, and these vent holes 108 are substantially in the shape of a partial ring, the bottom of the cylindrical portion 217 has a certain elasticity, such that when the insertion portion 346 is inserted into the mounting hole 343, the insertion portion 346 applies a force to the side wall of the mounting hole 343, to enable the mounting hole 343 to deform and expand. The expanded mounting hole 343 can allow the platform 668 to pass through the mounting hole 343. After the platform 668 has been passed through the mounting hole 343, the insertion portion 346 no longer applies the force to the side wall of the mounting hole 343, and the mounting hole 343 returns to a state in which the diameter thereof is slightly smaller than the outer peripheral diameter of the platform 668, so as to keep the insertion portion 346 in place.

Figure 7A:
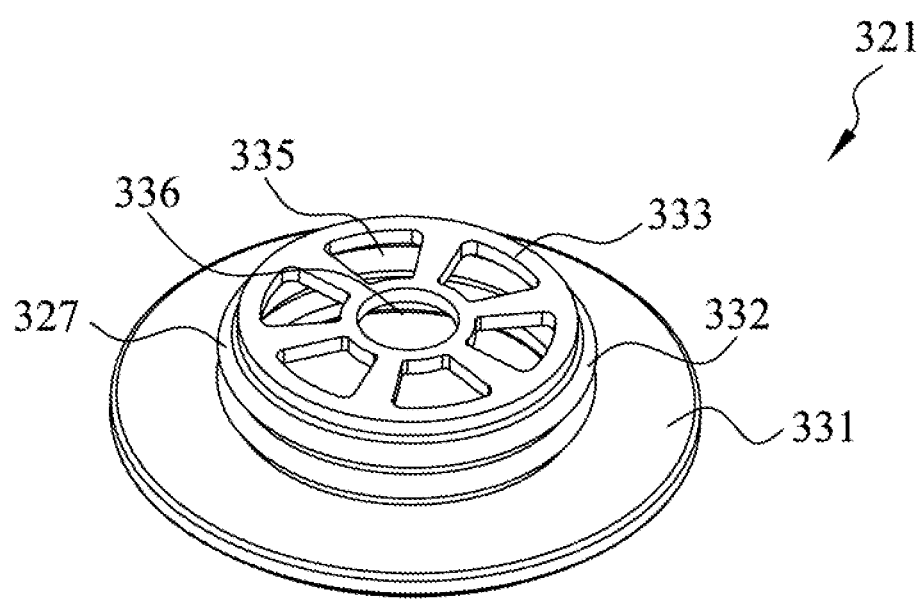
FIGS. 7A and 7B are structural perspective diagrams of a partition member in the pressure balancing device shown in FIG. 3A from two perspectives.
Figure 7B:
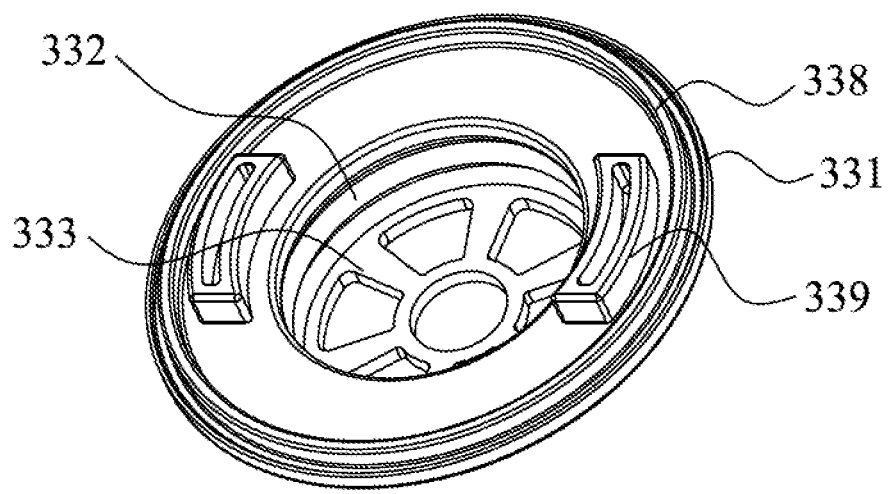

FIGS. 7A and 7B show structural perspective diagrams of the partition member 321 from two different perspectives, wherein FIG. 7A shows a perspective viewed from the top to the bottom, and FIG. 7B shows a view in which the partition member 321 shown in FIG. 6A has been overturned by an angle. As shown in FIGS. 7A and 7B, the support portion 333 of the partition member 321 is provided with a number of vent holes 335 arranged in a circle, and each of the vent holes 335 is sector-shaped. The receiving hole 336 is located at the center of the support portion 333 and is not in communication with the vent holes 335. Such an arrangement can ensure that the support portion 333 does not prevent air flow, and has a certain contact area with the breathable film 320 covering the vent holes 335 and the receiving hole 336, so that there is a certain connection strength between the support portion 333 and the breathable film 320, and it can be ensured that the support portion 333 drives the breathable film 320 to move along with it.

The connecting flange 331 is connected to the outer surface of the elastic portion 332, and the annular sealing periphery 338 on the bottom surface of the connecting flange 331 is in sealed connection with the mounting seat 111. In this way, a space below the support portion 333 can be in fluid communication with a space above the support portion 333 only through the vent holes 335 and the receiving hole 336 in the support portion 333. Since the elastic portion 332 has a predetermined holding force, in general, even if there is a certain pressure difference between the pressure below the support portion 333 and the pressure above the same, the corrugated portion 327 on the elastic portion 332 will not expand to be elastically deformed. However, in some special cases, when the gas pressure below the support portion 333 suddenly increases to be greater than the gas pressure above the support portion 333 by a preset value, the pressure difference acts on the support portion 333, such that the corrugated portion 327 of the elastic portion 332 elastically deforms, and the elastic portion 332 drives the support portion 333 to move upward until the spike portion 325 on the inner side of the cover 112 punctures the breathable film 320 and is received by the receiving hole 336. The punctured breathable film 320 makes the space below the support portion 333 communicate with the space above the support portion 333, so that the pressure below the support portion 333 and the pressure above the same are quickly balanced.

FIGS. 8A and 8B respectively show cross-sectional views of the pressure balancing device 100 mounted on the plate 101 along line A-A and line B-B shown in FIG. 1B. As shown in FIGS. 8A and 8B, the pressure balancing device 100 is snap-fitted in the mounting hole 102 in the plate 101 of the battery pack housing, the button portion 214 of the mounting seat 111 is substantially located above the plate 101, and the cylindrical portion 217 of the mounting seat 111 is substantially located below the plate 101. The bottom 559 of the button portion 214 abuts against the upper surface of the plate 101, and the wings 115 of the cylindrical portion 217 abut against the lower surface of the plate 101. Since the sealing ring 218 is mounted on the outer side of the bottom 559 of the button portion 214, the sealing ring 218 also tightly abuts against the upper surface of the plate 101 to prevent the pressure balancing device 100 from loosening on the battery pack housing. Furthermore, the arrangement of the sealing ring 218 also helps to seal between the pressure balancing device 100 and the battery pack housing, effectively preventing external dust particles or liquid from entering the inside of the battery pack through the gap between the pressure balancing device 100 and the plate 101. In this embodiment, only by engaging the bottom 559 of the button portion 214 of the mounting seat 111 and the wings 115 with the mounting holes 102, the pressure balancing device 100 can be secured to the battery pack housing without the need for additional mounting parts and mounting tools, and the assembly steps of the pressure balancing device 100 are greatly simplified. In addition, the cover 112, the mounting seat 111 and the covering member 322 of the pressure balancing device 100 of the present disclosure are all made of plastic, which not only reduces the weight of the pressure balancing device 100, but also simplifies the production process of the pressure balancing device 100 and reduces the production cost of the pressure balancing device 100.

The accommodating cavity 880 closed by the cover 112 is formed in the mounting seat 111. The partition member 321 divides the accommodating cavity 880 into an upper accommodating cavity 881 and a lower accommodating cavity 882. The upper accommodating cavity 881 is configured to be in fluid communication with the external environment, the lower accommodating cavity 882 is configured to be in fluid communication with the inside of the battery pack, and the upper accommodating cavity 881 is in fluid communication with the lower accommodating cavity 882 through the vent holes 335 and the receiving hole 336 in the support portion 333 and the breathable film 320.

Specifically, the bottom end face of the side wall 352 of the cover 112 of the pressure balancing device 100 abuts against the upper surface of the connecting flange 331 of the partition member 321, such that the annular sealing periphery 338 of the partition member 321 is tightly pressed against the inner side of the bottom 559 of the button portion 214 of the mounting seat 111, and is in sealed connection with the sealing groove 342. In this way, the partition member 321 can divide the accommodating cavity 880 into a first accommodating cavity 881, which is substantially between the inside of the button portion 214 of the mounting seat 111 and the outer side of the partition member 321 and is closed by the cover 112, and a second accommodating cavity 882, which is substantially defined by the cylindrical portion 217 and the inside of the partition member 321. The breathable film 320 is connected above the support portion 333 and is also located in the first accommodating cavity 881. The first accommodating cavity 881 is in communication with the external environment through the vent hole 113 in the cover 112, such that the gas pressure in the first accommodating cavity 881 is substantially the same as that of the external environment. The second accommodating cavity 882 is in communication with the inside of the battery pack through the vent hole 108 in the bottom of the cylindrical portion 217, so that the pressure in the second accommodating cavity 882 is substantially the same as the gas pressure inside the battery pack. As an example, the top 351 of the cover 112 and the snap-fit members 353 on the side wall 352 of the cover 112 do not need to completely abut against the side wall 558 of the button portion 214, instead, leaving a certain gap can better ensure the communication between the first accommodating cavity 881 and the external environment, and can facilitate the mounting of the cover 112 and the mounting seat 111.

When the gas pressure inside the battery pack is lower than that of the external environment (i.e., the gas pressure of the second accommodating cavity 882 is less than that of the first accommodating cavity 881), air from the external environment will enter the inside of the battery pack through the pressure balancing device 100. Specifically, the air from the external environment first enters the first accommodating cavity 881 of the pressure balancing device 100 through the vent hole 113 in the cover 112, and then sequentially passes through the breathable film 320, and the vent holes 335 and the receiving hole 336 in the support portion 333 of the partition member 321 to flow toward the second accommodating cavity 882. The air entering the second accommodating cavity 882 then passes through the hollowed-out channel 347 on the top plate 345 of the covering member 322 to flow to the accommodating space 341 and comes into contact with the drying component 333, and finally flows to the inside of the battery pack from the vent hole 108 at the bottom of the cylindrical portion 217.

When a battery cell inside the battery pack is in a working state, the temperature inside of the battery pack will rise, causing the gas pressure inside the battery pack to increase to be greater than the gas pressure of the external environment (i.e., the gas pressure of the second accommodating cavity 882 is greater than that of the first accommodating cavity 881); hot gas in the battery pack passes through the pressure balancing device 100 in the direction opposite to the above-mentioned flow direction, i.e., the gas first enters the second accommodating cavity 882, then enters the first accommodating cavity 881 through the support portion 333, passes through the breathable film 320 in the first accommodating cavity 881, and is then released into the external environment.

In the present disclosure, when the gas pressure in the first accommodating cavity 881 is greater than that in the second accommodating cavity 882, since the breathable film 320 can block liquid water but cannot block gaseous water, the water vapor contained in the air in the external environment may also enter the inside of the battery pack. In the present disclosure, the drying component 333 is provided in the second accommodating cavity 882 in the pressure balancing device 100, and can absorb the water vapor that enters the inside of the battery pack through the breathable film 320. In addition, the pressure balancing device 100 according to the present disclosure has a unique structural arrangement. Even if the drying component 333 is provided inside the pressure balancing device 100, the sufficient circulation of the gas flow can also be achieved. First, in the present disclosure, the drying component 333 is configured to be a plurality of desiccant particles. Since a plurality of gaps may be formed between the plurality of desiccant particles, the plurality of desiccant particles can better facilitate the circulation of gas than a bulk of drying component. Second, in the present disclosure, the accommodating space for placing the plurality of desiccant particles therein is hollowed out, for example, at the bottom of the accommodating space 341 and the top plate 345 of the covering member 322, a plurality of hollowed-out through holes are provided. The hollowed-out structure of the accommodating space can not only accommodate the desiccant particles, but also facilitate the communication between the air inside the accommodating space and the outside of the accommodating space, achieving the drying function without hindering the pressure relief function of the pressure balancing device 100. In the present disclosure, the accommodating space 341 is further divided into a plurality of sub-regions, wherein the desiccant particles are placed in only some of the sub-regions and the other sub-regions are completely vacant, thereby providing sufficient flow space for gas circulation. In addition, the partition plates 349 for separating the plurality of sub-regions are also hollowed out to ensure the fluid communication between the plurality of sub-regions. It can be seen that the regionalization of the drying component 333 not only enhances the circulation of gas in the desiccant accommodating space, but also enhances the fluid circulation between the inside and outside of the accommodating space.

When the gas pressure in the first accommodating cavity 881 is lower than that in the second accommodating cavity 882, the hot gas flow in the battery pack also causes the moisture otherwise would be absorbed in the drying component 323 to be discharged to the external environment, thereby achieving the function of self-drying of the drying component 323. That is to say, disposing the drying component 323 in the second accommodating cavity 882 of the pressure balancing device 100 can not only reduce the gas humidity inside the battery pack, but also recycle the drying component 323.

In some cases, the gas pressure inside the battery pack suddenly increases, and the breathable film 320 is not enough to provide enough pressure relief to quickly balance the gas pressure in the first accommodating cavity 881 and the gas pressure in the second accommodating cavity 882. Therefore, when the gas pressure in the battery pack suddenly increases, or the pressure difference between the first accommodating cavity 881 and the second accommodating cavity 882 is equal to or greater than a predetermined value, the gas pressure in the second accommodating cavity 882 is too high, causing the elastic portion 332 of the partition member 321 to be elastically deformed and stretched; and the elastic portion 332 drives the support portion 333 to move upward until the spike portion 325 on the inner side of the cover 112 punctures the breathable film 320 and is received by the receiving hole 336. In this case, the gas in the second accommodating cavity 882 can quickly circulate into the first accommodating cavity 881 through a hole in the breathable film 320 to relieve pressure, so that the pressure in the first accommodating cavity 881 and the pressure in the second accommodating cavity 882 are quickly balanced. As an example, the predetermined value of the pressure difference may be set according to specific needs, and the requirements for the predetermined value are met by adjusting the height of elastic deformation of the elastic portion 332 of the partition member 321 and the distance between the spike portion 325 and the breathable film.

Those skilled in the art can understand that the elastic portion 332 of the present disclosure may not have a corrugated deformable structure, but may be configured as another deformable structure, as long as the support portion 333 and the breathable film 320 can be driven to move toward the spike portion 325 when the pressure difference between the first accommodating cavity and the second accommodating cavity is greater than the predetermined value.

In the present disclosure, in order to ensure that under normal circumstances, the pressure balancing device 100 can balance the pressure inside the battery pack and the pressure in the external environment so that the inside of the battery pack is approximately at the atmospheric pressure, the breathable film 320 needs to have a good breathability. In some special cases, the pressure balancing device 100 also needs to be capable of quickly releasing the pressure inside the battery pack, for example, by providing a spike portion 325 to puncture the breathable film 320 to quickly release the pressure. Although when the pressure difference between the inner and outer sides of the breathable film 320 is relatively large, the breathable film 320 may deform to a certain extent and bulge toward the spike portion 325. However, due to the limitation of materials, in general, the deformation of the breathable film 320 is relatively difficult when the breathability is good.

The pressure balancing device 100 of the present disclosure comprises a partition member 321, uses the elastic deformation of the elastic portion 332 of the partition member 321 to move the breathable film 320, and enables the breathable film to be punctured by the spike portion 325 without relying on the elastic deformation of the breathable film 320 itself. Therefore, under certain requirements, the pressure balancing device 100 can quickly release the pressure inside the battery pack. Moreover, the breathable film 320 may also be made of a material with a better breathability. In an embodiment of the present disclosure, the breathable film 320 is made of a composite of a plastic material and a non-woven fabric material, which can meet the requirements for the breathability thereof.

Although the present disclosure will be described with reference to the specific embodiments shown in the accompanying drawings, it should be understood that many variations may be made to the pressure balancing device of the present disclosure without departing from the spirit, scope and background of the teachings of the present disclosure. Those of ordinary skill in the art will also appreciate that there are different ways to alter the structure in the embodiments disclosed in the present disclosure, and all the alterations fall within the spirit and scope of the present disclosure and the claims.

While various spatial and directional terms, such as top, bottom, lower, mid, lateral, horizontal, vertical, front, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A pressure balancing device, comprising:
 a mounting seat and a cover with one or more first vent holes, wherein an accommodating cavity is formed between the mounting seat and the cover;
 a partition member, wherein the partition member is disposed in the accommodating cavity and is connected to the mounting seat, and the partition member divides the accommodating cavity into a first accommodating cavity and a second accommodating cavity, wherein the first accommodating cavity is formed between the cover and the partition member and is configured to be capable of being in fluid communication with an external environment, and the second accommodating cavity is formed between the partition member and the mounting seat and is configured to be capable of being in fluid communication with an internal space of a component to be depressurized; wherein the partition member comprises a support portion and an elastic portion containing a cylindrical wall, the support portion is disposed between the first vent holes and the elastic portion, and the support portion is provided with one or more second vent holes capable of fluidly communicating between the first accommodating cavity and the second accommodating cavity; and wherein the cylindrical wall of the elastic portion comprises a corrugated portion configured to be elastically deformable so as to move the support portion relative to the cover; and
 a breathable film, wherein the breathable film is disposed between the first vent holes and the support portion and covers the second vent holes, and the breathable film is configured to be movable as the support portion moves.

2. The pressure balancing device according to claim 1, wherein
 the partition member is configured, when a pressure difference between the first accommodating cavity and the second accommodating cavity is greater than a preset value, to enable the elastic portion to be elastically deformed to move the support portion toward the cover, so as to drive the breathable film to move toward the cover.

3. The pressure balancing device according to claim 2, wherein
 the elastic portion is cylindrical, and the support portion closes one end of the cylindrical elastic portion; and
 the partition member further comprises a connecting flange, and the connecting flange protrudes outward from an outer surface of the cylindrical elastic portion; wherein the partition member is connected to the mounting seat via the connecting flange.

4. The pressure balancing device according to claim 3, wherein
 the corrugated portion is configured to be expandable or contractible in a deformation direction of the elastic portion, so as to move the support portion.

5. The pressure balancing device according to claim 4, wherein
 the connecting flange is in an annular shape extending outward around the outer surface of the cylindrical elastic portion, the annular connecting flange comprises an annular sealing periphery protruding toward the mounting seat, and the partition member is in sealed connection with the mounting seat via the annular sealing edge.

6. The pressure balancing device according to claim 5, wherein
 an inner surface of the cover is provided with a spike portion, the spike portion protrudes toward the breathable film, and the spike portion is configured to be capable of puncturing the breathable film.

7. The pressure balancing device according to claim 6, wherein
 the support portion is further provided with a receiving hole, and the receiving hole is configured to be capable of receiving the spike portion of the cover.

8. The pressure balancing device according to claim 1, wherein
the breathable film is made of a composite of a plastic material and a non-woven fabric material.

9. The pressure balancing device according to claim 1, wherein
the partition member is integrally formed from a rubber material.

10. The pressure balancing device according to claim 1, wherein
the breathable film is molded on the partition member.

11. A pressure balancing device, comprising:
a mounting seat and a cover, wherein an accommodating cavity is formed between the mounting seat and the cover;
a partition member having a support portion, a cylindrical elastic portion, and a connecting flange, wherein the partition member is disposed in the accommodating cavity and is sealed to the mounting seat and the cover at the connecting flange, and the partition member divides the accommodating cavity into a first accommodating cavity and a second accommodating cavity, wherein the first accommodating cavity is formed between the cover and the partition member and is configured to be capable of being in fluid communication with an external environment, and the second accommodating cavity is formed between the partition member and the mounting seat and is configured to be capable of being in fluid communication with an internal space of a component to be depressurized; the support portion is connected to a first end of the elastic portion, the connecting flange is connected to a second end of the elastic portion, and the support portion is provided with a vent hole capable of fluidly communicating between the first accommodating cavity and the second accommodating cavity, and the elastic portion is configured to be elastically deformable so as to move the support portion toward or away from the cover and the connecting flange; and wherein the elastic portion includes a cylindrical wall that comprises a corrugated portion that expands or contracts to move the support portion; and
a breathable film, wherein the breathable film is disposed on the support portion and covers the vent hole in the support portion, and the breathable film is configured to be movable as the support portion moves.

12. The pressure balancing device according to claim 11, wherein
the partition member is configured such that when a pressure difference between the first accommodating cavity and the second accommodating cavity is greater than a preset value, to enable the elastic portion to be elastically deformed to move the support portion and the breathable film toward the cover.

13. The pressure balancing device according to claim 12, wherein
the connecting flange protrudes outward from an outer surface of the elastic portion.

14. The pressure balancing device according to claim 13, wherein
the connecting flange has an annular shape extending outward around the outer surface of the cylindrical elastic portion, the annular connecting flange comprises an annular sealing periphery protruding toward the mounting seat, and the partition member is in sealed connection with the mounting seat via the annular sealing edge.

15. The pressure balancing device according to claim 14, wherein
an inner surface of the cover is provided with a spike portion that protrudes toward the breathable film, the spike portion configured to puncture the breathable film, wherein the support portion is further provided with a receiving hole, and the receiving hole is configured to be capable of receiving the spike portion of the cover.

16. A pressure balancing device, comprising:
a mounting seat and a cover including a spike projecting from an inner surface, wherein an accommodating cavity is formed between the mounting seat and the cover;
a partition member, wherein the partition member is disposed in the accommodating cavity and is connected to the mounting seat, and the partition member divides the accommodating cavity into a first accommodating cavity and a second accommodating cavity, wherein the first accommodating cavity is formed between the cover and the partition member and is configured to be capable of being in fluid communication with an external environment, and the second accommodating cavity is formed between the partition member and the mounting seat and is configured to be capable of being in fluid communication with an internal space of a component to be depressurized; and wherein the partition member comprises a support portion and a cylindrical elastic portion, the support portion is disposed between the elastic portion and the inner surface, the support portion including a receiving hole that is radially surrounded by a plurality of vent holes, the receiving hole configured to receive the spike, the plurality of vent holes configured to provide fluid communication between the first accommodating cavity and the second accommodating cavity, and the elastic portion contains a cylindrical wall that comprises a corrugation portion configured to be elastically deformable so as to move the support portion relative to the cover; and
a breathable film, wherein the breathable film is disposed on the support portion and covers the vent hole in the support portion, and the breathable film is configured to move when the support portion moves.

17. The pressure balancing device according to claim 16, wherein
the partition member is configured such that when a pressure difference between the first accommodating cavity and the second accommodating cavity is greater than a preset value, the elastic portion elastically deforms and moves the support portion and the breathable film toward the cover.

18. The pressure balancing device according to claim 17, wherein
the elastic portion is cylindrical, and the support portion closes one end of the cylindrical elastic portion; and
the partition member further comprises a connecting flange, and the connecting flange protrudes outward from an outer surface of the cylindrical elastic portion;
wherein the partition member is connected to the mounting seat via the connecting flange.

19. The pressure balancing device according to claim 18, wherein
the corrugated portion is configured to expand or contract in a deformation direction to move the support portion, and wherein
the connecting flange has an annular shape extending outward from the outer surface of the cylindrical elastic portion, the annular connecting flange comprises an annular sealing periphery protruding toward the mounting seat, and the partition member is in sealed connection with the mounting seat via the annular sealing edge.

20. The pressure balancing device according to claim 19 wherein
the spike protrudes toward the breathable film, and the spike is configured to puncture the breathable film when the spike is received within the receiving hole.

* * * * *